US010036671B2

(12) United States Patent
Phan Le et al.

(10) Patent No.: US 10,036,671 B2
(45) Date of Patent: Jul. 31, 2018

(54) METHOD OF PREDICTING AN AMBIENT TEMPERATURE AROUND A MOBILE DEVICE, COMPUTER PROGRAM PRODUCT AND MOBILE DEVICE

(71) Applicant: NXP B.V., Eindhoven (NL)

(72) Inventors: Kim Phan Le, Eindhoven (NL); Pei Sin Ng, Singapore (SG)

(73) Assignee: NXP B.V., Eindhoven (NL)

(*) Notice: Subject to any disclaimer, the term of this patent is extended or adjusted under 35 U.S.C. 154(b) by 269 days.

(21) Appl. No.: 14/824,757

(22) Filed: Aug. 12, 2015

(65) Prior Publication Data

US 2016/0069753 A1    Mar. 10, 2016

(30) Foreign Application Priority Data

Sep. 5, 2014 (EP) .................................... 14183811

(51) Int. Cl.
*G01K 7/42* (2006.01)
*H04M 1/02* (2006.01)

(52) U.S. Cl.
CPC ............ *G01K 7/42* (2013.01); *H04M 1/0202* (2013.01); *H04M 2250/12* (2013.01)

(58) Field of Classification Search
CPC ........................ H04M 2250/12; H04M 1/0202
See application file for complete search history.

(56) References Cited

U.S. PATENT DOCUMENTS

| 7,387,437 | B2 | 6/2008 | Brown et al. |
| 7,809,396 | B2* | 10/2010 | Miyauchi ............... H04B 1/036 |
| | | | 455/127.1 |
| 2003/0064749 | A1 | 4/2003 | Soini et al. |
| 2003/0129964 | A1 | 7/2003 | Kohinata et al. |

(Continued)

FOREIGN PATENT DOCUMENTS

| CN | 103196574 A | 7/2013 |
| EP | 2 682 715 A1 | 1/2014 |

OTHER PUBLICATIONS

Extended European Search Report for Application 14183811.0 (dated Dec. 4, 2014).

*Primary Examiner* — Kretelia Graham

(57) ABSTRACT

There is disclosed a method of predicting an ambient temperature around a mobile device, wherein: a primary temperature sensor comprised in said mobile device measures a first temperature value; at least one secondary temperature sensor comprised in said mobile device measures a second temperature value; a processing unit comprised in said mobile device calculates a first prediction of an ambient temperature around the mobile device in dependence on the first temperature value and at least one parameter which is indicative of a thermal influence of one or more mobile device components on the measurements; the processing unit calculates a second prediction of said ambient temperature in dependence on the second temperature value and said parameter; the processing unit compares the first prediction with the second prediction and adjusts said (Continued)

parameter if the difference between the first prediction and the second prediction exceeds a predefined maximum. Furthermore, a corresponding computer program product and a corresponding mobile device are disclosed.

13 Claims, 6 Drawing Sheets

(56) References Cited

U.S. PATENT DOCUMENTS

| | | |
|---|---|---|
| 2006/0209921 A1 | 9/2006 | Brown et al. |
| 2007/0299322 A1* | 12/2007 | Miyajima ............ A61B 5/0008 600/301 |
| 2009/0144014 A1 | 6/2009 | Aljabari |
| 2011/0119018 A1* | 5/2011 | Skarp ........................ G01K 7/42 702/130 |
| 2011/0273378 A1 | 11/2011 | Alameh et al. |
| 2013/0099008 A1 | 4/2013 | Aljabari et al. |
| 2013/0259092 A1 | 10/2013 | Im et al. |
| 2014/0066124 A1* | 3/2014 | Novet ................ H04M 1/72569 455/556.1 |
| 2014/0266404 A1* | 9/2014 | Jang .................... G06F 11/3058 327/509 |
| 2014/0328367 A1* | 11/2014 | Niederberger ........... G01K 1/20 374/1 |
| 2016/0003692 A1* | 1/2016 | Ng ........................ G01K 15/00 702/99 |

\* cited by examiner

METHOD OF PREDICTING AN AMBIENT TEMPERATURE AROUND A MOBILE DEVICE, COMPUTER PROGRAM PRODUCT AND MOBILE DEVICE

CROSS-REFERENCE TO RELATED APPLICATIONS

This application claims the priority under 35 U.S.C. § 119 of European patent application no. 14183811.0, filed Sep. 5, 2014 the contents of which are incorporated by reference herein.

FIELD

The present disclosure relates to a method of predicting an ambient temperature around a mobile device. Furthermore, the present disclosure relates to a corresponding computer program product and to a corresponding mobile device.

BACKGROUND

Modern mobile devices, such as smart phones and tablets, often contain temperature sensors which are used to measure the ambient temperature around said devices. However, the temperature sensors within such mobile devices should ideally be placed as close as possible to the medium whose temperature should be measured, i.e. the ambient air, in order to yield reliable measurement results. However, temperature sensors can only be housed within the body of a mobile phone, for cosmetic and functional reasons. Unfortunately, temperature sensors placed within a casing or enclosure exhibit a relatively large response time. That is to say, it takes a relatively large amount of time, for example 15 to 40 minutes, before an embedded temperature sensor accurately measures the ambient air temperature. It may be desirable to reduce this response time. Therefore, attempts have been made to predict the ambient temperature around mobile devices. However, there may still be a need to increase the accuracy of such ambient temperature predictions.

SUMMARY

There is disclosed a method of predicting an ambient temperature around a mobile device, wherein: a primary temperature sensor comprised in said mobile device measures a first temperature value; at least one secondary temperature sensor comprised in said mobile device measures a second temperature value; a processing unit comprised in said mobile device calculates a first prediction of an ambient temperature around the mobile device in dependence on the first temperature value and at least one parameter which is indicative of a thermal influence of one or more mobile device components on the measurements; the processing unit calculates a second prediction of said ambient temperature in dependence on the second temperature value and said parameter; the processing unit compares the first prediction with the second prediction and adjusts said parameter if the difference between the first prediction and the second prediction exceeds a predefined maximum.

In an illustrative embodiment, the processing unit repeatedly recalculates the first prediction and the second prediction, compares the first prediction with the second prediction and adjusts said parameter until the difference between the first prediction and the second prediction is equal to or lower than the predefined maximum.

In a further illustrative embodiment, if the difference between the first prediction and the second prediction is equal to or lower than the predefined maximum, the processing unit concludes that the ambient temperature is equal to the first prediction, to the second prediction or to a value between the first prediction and the second prediction.

In a further illustrative embodiment, said parameter is at least indicative of a thermal resistance of a casing of the mobile device.

In a further illustrative embodiment, the primary temperature sensor and the secondary temperature sensor are located at different positions in the mobile device, such that the thermal resistance between the primary temperature sensor and the ambient air is different from the thermal resistance between the secondary temperature sensor and the ambient air.

In a further illustrative embodiment, the primary temperature sensor is located closer to the edge of the mobile device than the secondary temperature sensor.

Furthermore, there is disclosed a computer program product comprising executable instructions which, when being executed by a processing unit, cause said processing unit to carry out or control steps of a method of the kind set forth.

Furthermore, there is disclosed a mobile device comprising: a primary temperature sensor being arranged to measure a first temperature value; at least one secondary temperature sensor being arranged to measure a second temperature value; a processing unit being arranged to calculate a first prediction of an ambient temperature around the mobile device in dependence on the first temperature value and at least one parameter which is indicative of a thermal influence of one or more mobile device components on the measurements; the processing unit further being arranged to calculate a second prediction of said ambient temperature in dependence on the second temperature value and said parameter; the processing unit further being arranged to compare the first prediction with the second prediction and to adjust said parameter if the difference between the first prediction and the second prediction exceeds a predefined maximum.

In an illustrative embodiment, the processing unit is further arranged to repeatedly recalculate the first prediction and the second prediction, compare the first prediction with the second prediction and adjust said parameter until the difference between the first prediction and the second prediction is equal to or lower than the predefined maximum.

In a further illustrative embodiment, the processing unit is further arranged to conclude, if the difference between the first prediction and the second prediction is equal to or lower than the predefined maximum, that the ambient temperature is equal to the first prediction, to the second prediction or to a value between the first prediction and the second prediction.

In a further illustrative embodiment, said parameter is at least indicative of a thermal resistance of a casing of the mobile device.

In a further illustrative embodiment, the primary temperature sensor and the secondary temperature sensor are located at different positions in the mobile device, such that the thermal resistance between the primary temperature sensor and the ambient air is different from the thermal resistance between the secondary temperature sensor and the ambient air.

In a further illustrative embodiment, the primary temperature sensor is located closer to the edge of the mobile device than the secondary temperature sensor.

In a further illustrative embodiment, the processing unit is integrated with the primary temperature sensor in a single chip.

In a further illustrative embodiment, the mobile device comprises a plurality of secondary temperature sensors, and the processing unit is further arranged to calculate a plurality of second predictions based on second temperature values measured by said secondary temperature sensors and on said parameter, to compare each second prediction with the first prediction, and to adjust the parameter until the difference between each second prediction and the first prediction is equal to or smaller than the predefined maximum.

DESCRIPTION OF DRAWINGS

Embodiments will be described in more detail with reference to the appended drawings, in which.

DESCRIPTION OF EMBODIMENTS

Many modern mobile devices are equipped with a temperature sensor for measuring the ambient temperature. However, in many cases an on-board temperature sensor will fail to show the correct temperature of the surrounding air, for example when the phone is subjected to a sudden change in temperature. This is typically caused by the thermal influence of mobile device components surrounding the temperature sensor, for example of a casing of the mobile device and/or processing units that generate a lot of heat. Attempts have been made to solve this problem, in particular by using computer-implemented methods or algorithms based on a thermal model of a mobile device, in order to predict the ambient temperature. This type of prediction algorithm may take one or more parameters which are indicative of thermal influences of mobile device components as an input. However, the prediction may still need improvement, in particular when environmental conditions change very rapidly.

More specifically, the prediction works well when the environmental conditions under which the measurements are performed are substantially the same as the conditions under which the parameters have been calibrated. Typically, the parameters of a thermal model are predetermined, i.e. their value is determined by experiment or calibration, for example in a laboratory. In practice, the parameters may need to be changed significantly depending on how the user handles the mobile device while the measurements are being performed. For instance, during the temperature reading, there may be changing wind, or the user may hold the device in his hand instead of putting it on a table, or the user may put the device on a different surface (for example a wooden surface instead of a metal surface). Moreover, the user may decide to put a cover on the phone. In those circumstances, the thermal resistance between the mobile device and the ambient air will change in unexpected ways, which may make the predefined thermal model invalid and which may lead to a less accurate prediction. Thus, in case of rapidly changing environmental conditions, the parameters may need to be adjusted or readjusted. Therefore, in accordance with the present disclosure, it is proposed to use a plurality of temperature sensors at different locations in a mobile device, in order to provide additional information for determining the correct parameter values during ambient temperature prediction. More specifically, in accordance with the present disclosure, a method of operating a mobile device is conceived as described below.

Figure 1A:
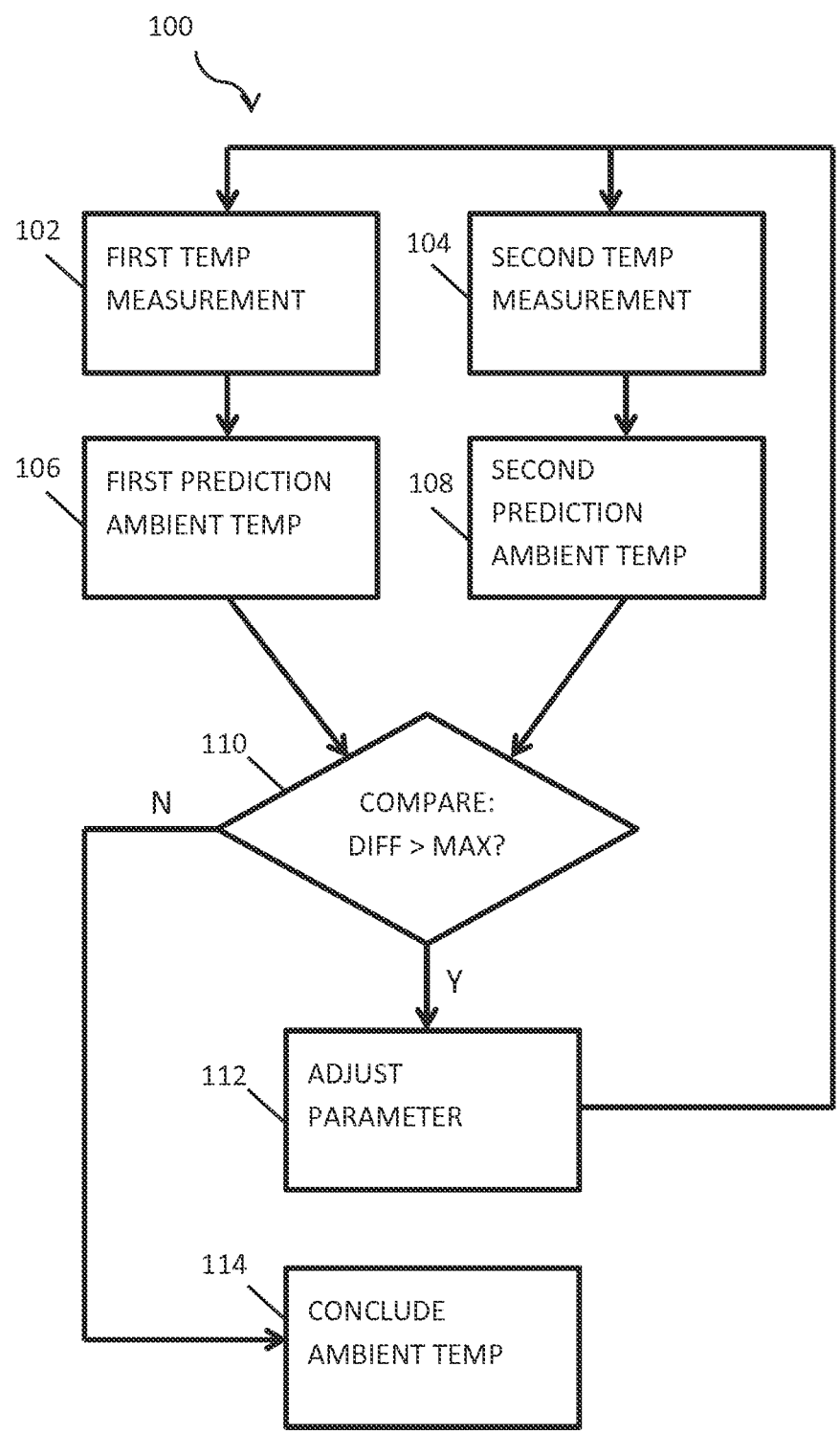
FIG. 1A shows an illustrative embodiment of a method of operating a mobile device.

FIG. 1A shows an illustrative embodiment of a method 100 of predicting an ambient temperature around a mobile device. A primary temperature sensor comprised in said mobile device measures at 102 a first temperature value, and at least one secondary temperature sensor comprised in said mobile device measures, at 104, a second temperature value. Then, a processing unit comprised in said mobile device calculates, at 106, a first prediction of an ambient temperature around the mobile device in dependence on the first temperature value and at least one parameter which is indicative of a thermal influence of one or more mobile device components on the measurements. Furthermore, the processing unit calculates, at 108, a second prediction of said ambient temperature in dependence on the second temperature value and said parameter. Furthermore, the processing unit compares, at 110, the first prediction with the second prediction and adjusts, at 112, said parameter if the difference between the first prediction and the second prediction exceeds a predefined maximum.

The steps of calculating the first prediction and the second prediction, comparing them and adjusting the parameter may be repeated until the difference between the first prediction and the second prediction are equal to or lower than the predefined maximum. In this way, mistuned parameters may be corrected in a step-wise fashion. Furthermore, if the difference between the first prediction and the second prediction is equal to or lower than the predefined maximum, the processing unit may conclude, at 114, that the ambient temperature is equal to the first prediction, the second prediction or a value between the first prediction and the second prediction.

Figure 1B:
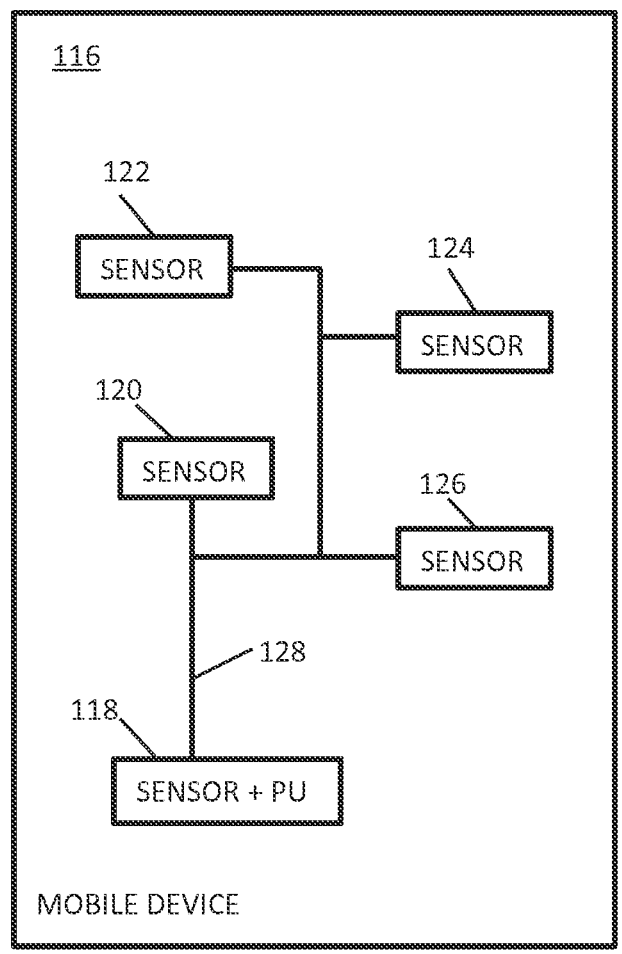
FIG. 1B shows an illustrative embodiment of a mobile device.

FIG. 1B shows an illustrative embodiment of a mobile device 116. The mobile device 116 comprises a plurality of temperature sensors 118, 120, 122, 124, 126. One temperature sensor 118 may be referred to as a primary sensor. In this embodiment, the primary sensor 118 is integrated with a processing unit in a single chip. The other sensors 120, 122, 124, 126 may be referred to as secondary sensors. The sensors 118, 120, 122, 124, 126 may be connected to each other by means of a data bus 128, through which data may be transmitted. The primary sensor 118 may be mounted as close as possible to the environment surrounding the mobile device, for example near the edge of the mobile device, and preferably at a relatively cool place, i.e. remote from any heat source such as a central processing unit (not shown). The secondary sensors 120, 122, 124, 126 may be located deeper inside the body of the mobile device, for example near heat-producing components. Thereby, the sensors are strategically positioned in the mobile device, such that they have a different thermal resistance to the ambient air due to the differences in their exposure to surrounding components. The thermal influence of mobile device components on the measurements performed by the different sensors will consequently have a certain degree of variation. Thus, by positioning the sensors in this way, the variation in the thermal influence of said components may be taken into account, and the parameter indicative of said influence may be better and more reliably adjusted.

The sensors 118, 120, 122, 124, 126 may exchange data via any kind of data bus 128, such as I²C, SPI, SLIMBus, and Sensor Hub. The secondary sensors 120, 122, 124, 126 may either be separate temperature sensor chips or components that contain several sensors for different modalities. The secondary sensors 120, 122, 124, 126 may also be existing temperature sensors in other components such as in a battery or a microprocessor of the mobile device. In this case, data exchange may be done via the operating system of the mobile device. The primary sensor chip may include a microprocessor or microcontroller for executing the prediction algorithm. By integrating a small processing unit with the primary temperature sensor in a single chip costs may be reduced and the implementation on a printed circuit board may be facilitated. The prediction algorithm may be implemented as a computer program stored in the microcontroller's memory, for example. The primary sensor 118 may behave as a master while the secondary sensors 120, 122, 124, 126 may behave as slaves in the network. In this way, all measurement data collected by the secondary sensors 120, 122, 124, 126 may easily be copied to the primary sensor 118 for processing and prediction. Furthermore, at least a part of the processing and the prediction algorithm may be executed by the operating system of the mobile device. Furthermore, the locations of the primary sensor 118 and the secondary sensors 120, 122, 124, 126 may be reversed. That is to say, one of the secondary sensors 120, 122, 124, 126 may, for example, be located close to the edge of the mobile device, while the primary sensor and other secondary sensors may be located deeper inside the body of the mobile device. It is noted that, although a plurality of sensors has been shown in this embodiment, the mobile device may comprise only a single secondary sensor.

Figure 1C:
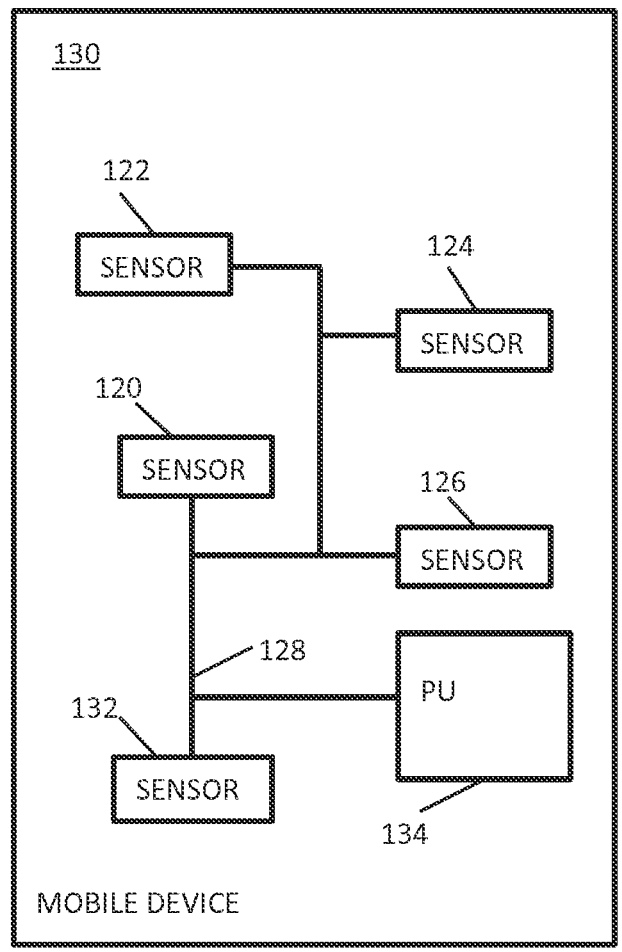
FIG. 1C shows a further illustrative embodiment of a mobile device.

FIG. 1C shows a further illustrative embodiment of a mobile device 130. In this embodiment, the mobile device 130 comprises a separate processing unit 134 for processing the inputs of both the primary sensor 132 and the secondary sensors 120, 122, 124, 126, and for executing the prediction algorithm. By separating the processing unit 134 from the primary sensor 132, the primary sensor 132 may be placed closer to the ambient air and consequently less self-heating corrections may be required.

It is noted that, in accordance with the present disclosure, a plurality of secondary temperature sensors may be used, which may be positioned strategically in the mobile device as shown in FIGS. 1B and 1C. In that case, the processing unit may calculate predictions of the ambient temperature in dependence of the temperature values measured by all secondary temperature sensors and the parameter in question—i.e. it may calculate a plurality of second predictions—, compare each second prediction with the first prediction, and adjust the parameter until the difference between each second prediction and the first prediction is equal to or smaller than the predefined maximum, for example. In this way, errors in the predictions may to a certain extent be averaged out, and more accurate results may be generated.

Figure 2:
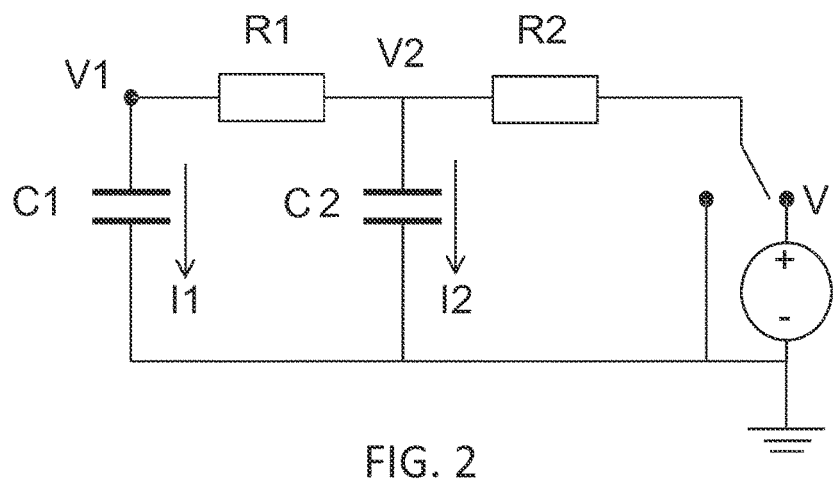
FIG. 2 shows an electrical model which may represent the thermal properties of a mobile device.

FIG. 2 shows an electrical model which may represent the thermal properties of a mobile device. The presently disclosed method will now be illustrated with reference to an example based on this electrical model. The components of the electrical model shown in FIG. 2 may represent parameters which are indicative of thermal influences of mobile device components on temperature sensors within a mobile device. The thermal problem of a mobile device may be represented as an RC ladder network having 2 rungs for the sake of simplicity. It is noted that more rungs in the circuit may increase the model's accuracy. Capacitor C1 and resistor R1 may represent the thermal capacitance and the thermal resistance, respectively, of the inner part of the mobile device. Capacitor C2 and resistor R2 may represent the thermal capacitance and the thermal resistance, respectively, of the outer part or periphery of the mobile device. In particular, resistor R2 may for example represent all thermal resistances from the casing of the mobile device to the infinite ambient air, which acts as a heat sink. Since the casing is not a single point, in principle thermal flux from the interior of the mobile device can find many ways on the entire surface of the casing to escape to the ambient air. In order to represent these escape routes, one could in theory model them as a plurality of thermal resistors. However, in the simplified model described herein all these resistors are lumped together into a single resistor R2 which represents the escape routes of thermal flux from the mobile device to the ambient air, i.e. it represents all thermal resistances from the casing to the ambient air. The voltage at node V2 may represent the temperature at a certain position close to the ambient air, while the voltage at node V1 may represent the temperature at a position deeper inside the mobile device.

In this thermal model, subjecting the mobile device to ambient air may be regarded as equivalent to connecting the free end of resistor R2 to a voltage source V. For instance, it may be assumed that, in an initial state, the mobile device is in equilibrium with a cool room environment. In the circuit of FIG. 2, this state is represented by the free end of resistor R2 being connected to ground and all capacitors C1, C2 being fully discharged. The ground potential is equivalent to room temperature. If the mobile device is quickly moved to an environment with a significantly higher temperature, then this will be equivalent to the free end of resistor R2 being switched to the voltage source V. The voltage of the source V will then be equivalent to the temperature difference between the room and the new environment. Simulating transient voltages at nodes V1 and V2 reveals how the temperature at these nodes behaves in time when the mobile device is subjected to a step-function of ambient temperature change. By using Kirchhoff's circuit law and Laplace transform, analytical formulas for V1($t$) and V2($t$) can be derived as follows:

$$V_1 = V(1 - \alpha_{11} e^{-k_1 t} - \alpha_{12} e^{-k_2 t}) \quad \text{(Equation 1)}$$

$$V_2 = V(1 - \alpha_{21} e^{-k_1 t} - \alpha_{22} e^{-k_2 t}) \quad \text{(Equation 2)}$$

in which:

$$\alpha_{11} = \frac{1}{2}\left(1 - \frac{C_1 R_1 + C_1 R_2 + C_2 R_2}{\sqrt{\beta}}\right) \quad \text{(Equation 3)}$$

$$\alpha_{12} = \frac{1}{2}\left(1 + \frac{C_1 R_1 + C_1 R_2 + C_2 R_2}{\sqrt{\beta}}\right) \quad \text{(Equation 4)}$$

$$\alpha_{21} = \frac{1}{2}\left(1 - \frac{-C_1 R_1 + C_1 R_2 + C_2 R_2}{\sqrt{\beta}}\right) \quad \text{(Equation 5)}$$

$$\alpha_{22} = \frac{1}{2}\left(1 + \frac{-C_1 R_1 + C_1 R_2 + C_2 R_2}{\sqrt{\beta}}\right) \quad \text{(Equation 6)}$$

$$k_1 = \frac{1}{2 C_1 R_1} + \frac{1}{2 C_2 R_1} + \frac{1}{2 C_2 R_2} + \frac{\sqrt{\beta}}{2 C_1 C_2 R_1 R_2} \quad \text{(Equation 7)}$$

$$k_2 = \frac{1}{2C_1R_1} + \frac{1}{2C_2R_1} + \frac{1}{2C_2R_2} - \frac{\sqrt{\beta}}{2C_1C_2R_1R_2} \quad \text{(Equation 8)}$$

$$\beta = (C_1R_1 + C_1R_2 + C_2R_2)^2 - 4C_1C_2R_1R_2 \quad \text{(Equation 9)}$$

Since the voltage is equivalent to temperature in the electrical model, V2 and V1 may actually represent temperatures T2 and T1 at a position close to the outer part of the mobile device and a position deeper inside the body of the mobile device, respectively. Thus, if the initial temperature of the system is $T_0$ (steady state), and the mobile device is subjected to another ambient temperature $T_A$, then the temperatures T1 and T2 can be re-written as:

$$T1(t) = T_A - (T_A - T_0)(\alpha_{11}e^{-k_1t} - \alpha_{12}e^{-k_2t}) \quad \text{(Equation 10)}$$

$$T2(t) = T_A - (T_A - T_0)(\alpha_{21}e^{-k_1t} - \alpha_{22}e^{-k_2t}) \quad \text{(Equation 11)}$$

in which $T_A - T_0 \equiv V$.

Equations (10) and (11) give the time response of temperatures T1 and T2 when the system is subjected to a step function in ambient temperature. As an example, by selecting R1=R2=100 K/W, and C1=C2=1 J/K, the changes in time of T1 and T2 can be plotted, as shown in FIG. 3.

Figure 3:
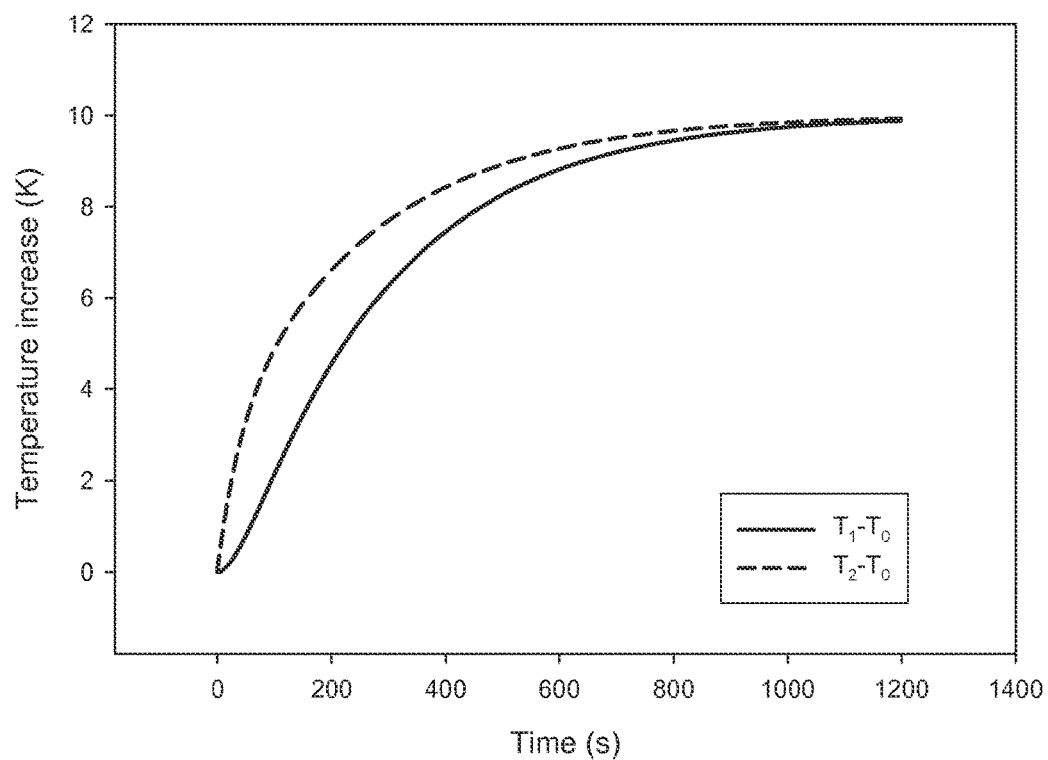
FIG. 3 shows an example of a response to a temperature increase.

FIG. 3 shows an example of a response to a temperature increase. It can be seen that the temperature T1, i.e. at a position deeper inside the body of the mobile device, responds relatively slowly to a change in ambient temperature, while the temperature T2, i.e. at a position close to the outer part of the mobile device, responds faster to the ambient temperature change.

Disregarding the difference between T1 and T2, the ambient temperature may be predicted in dependence on an initial temperature value (To) and a current temperature value (T=T1=T2) by means of the following formula:

$$T_A = \frac{T - T_0[\alpha_1 e^{-k_1t} + \alpha_2 e^{-k_2t}]}{1 - [\alpha_1 e^{-k_1t} + \alpha_2 e^{-k_2t}]} \quad \text{(Equation 12)}$$

Figure 4:
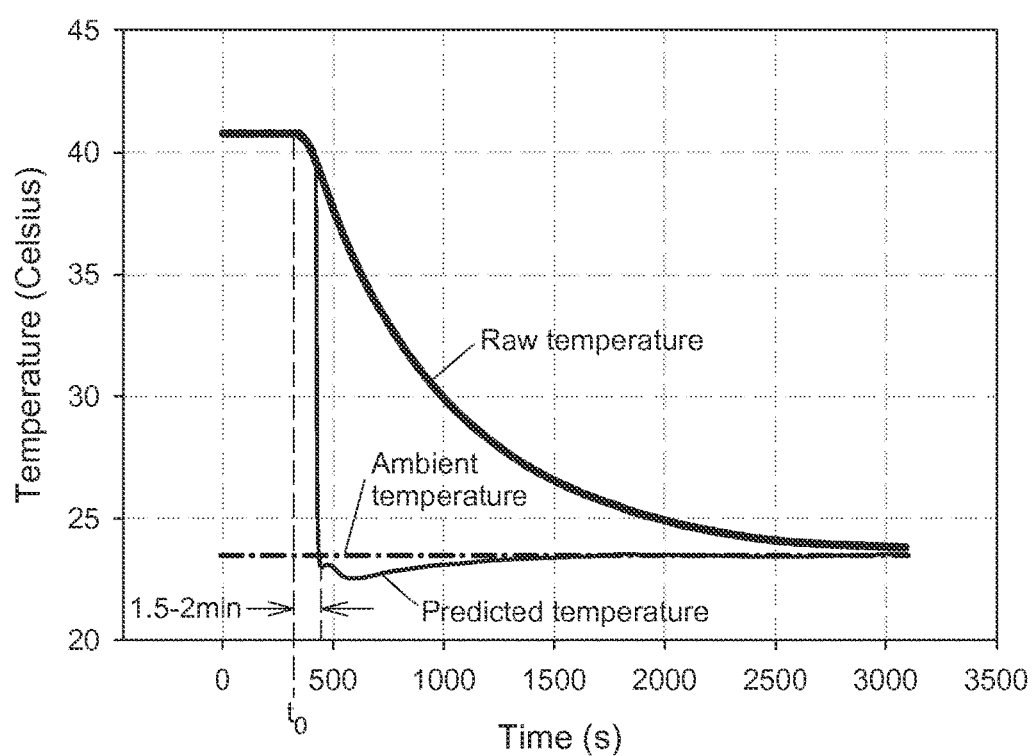
FIG. 4 shows a typical result of an ambient temperature prediction.

The parameters $\alpha 1$, $\alpha 2$, $k1$, $k2$ are typically predetermined by experiment or calibration. FIG. 4 shows a typical result of an ambient temperature prediction which is based on this formula. While the measured raw temperature shows a slow exponential decay after the system is exposed to a new temperature (at time $t_0$), which may last for nearly an hour, the predicted temperature is relatively close to the actual ambient temperature within 1.5 to 2 minutes. The prediction of the ambient temperature is accurate as long as the environmental conditions under which the temperature measurement takes place are substantially the same as the standard conditions, i.e. the conditions under which the parameters have been predetermined by experiment or calibration. However, in reality, the environmental conditions may change from time to time. For instance, when there is wind (possibly with different velocity at different time instants), or when the device is put on different table surfaces or in an extra cover, the parameters may have to be changed in order to provide an accurate prediction.

Therefore, in accordance with the present disclosure, a primary sensor may measure temperature T2 at node V2, and a secondary sensor may measure temperature T1 at node V1. If the conditions under which, in operation, the measurements are performed are substantially the same as the standard conditions, then the predicted $T_A$ values derived—by means of Equation 12—from either T1 or T2 are typically also substantially the same. However, if the measurement conditions have changed, then the predictions of $T_A$ derived from T1 and T2 may deviate from each other. Furthermore, the predictions of $T_A$ derived from T1 and T2 may both deviate from the optimal prediction of $T_A$. Therefore, the predictions of $T_A$ derived from T1 and T2 are compared with each other in order to evaluate if the parameter values are still correct. Thus, the following calculations are made:

$$T_{A1} = \frac{T1 - T_0[\alpha_{11}e^{-k_1t} + \alpha_{12}e^{-k_2t}]}{1 - [\alpha_{11}e^{-k_1t} + \alpha_{12}e^{-k_2t}]} \quad \text{(Equation 13)}$$

$$T_{A2} = \frac{T2 - T_0[\alpha_{21}e^{-k_1t} + \alpha_{22}e^{-k_2t}]}{1 - [\alpha_{21}e^{-k_1t} + \alpha_{22}e^{-k_2t}]} \quad \text{(Equation 14)}$$

A mismatch in the $T_A$ predictions, i.e. a mismatch between $T_A1$ and $T_A2$, may indicate that the environmental conditions have changed and that one or more parameters may have to be changed. Therefore, if the difference between $T_A1$ and $T_A2$ exceeds a predefined maximum, then the presently disclosed method will adjust at least one parameter in order to decrease said mismatch. Thereby, the predictions of $T_A$ may be brought closer to the optimal prediction of $T_A$. If the difference between $T_A1$ and $T_A2$ is equal to or lower than the predefined maximum, then either $T_A1$ or $T_A2$ may be selected as a correct prediction of $T_A$, because the difference between $T_A1$ and $T_A2$ may be regarded as negligible. Also, any value between $T_A1$ or $T_A2$ may be selected as a correct prediction of $T_A$.

The number of parameters which is adjusted may be limited. Preferably, only one parameter is adjusted in order to reduce the computation time and power consumption of the processing unit. For example, in the model shown in FIG. 2, a suitable parameter to be adjusted is the thermal resistance R2 from the outer part of the mobile device to the ambient air. If the mobile device is exposed to wind, or when the mobile device is held in a user's hand or inserted into a cover or a sleeve, then this thermal resistance R2 may change. Other adjustable parameters are, for example, the thermal capacitance of said outer part and its thermal time constant, which may be defined as the product of its thermal capacitance and its thermal resistance. Other combinations of the thermal resistance and the thermal capacitance may also form suitable parameters. Furthermore, other parameters that may be adjusted are parameters which are not directly related to the physical model, such as the coefficients $\alpha 11, \ldots, \alpha 22$ in the above-given equations.

Figure 5:
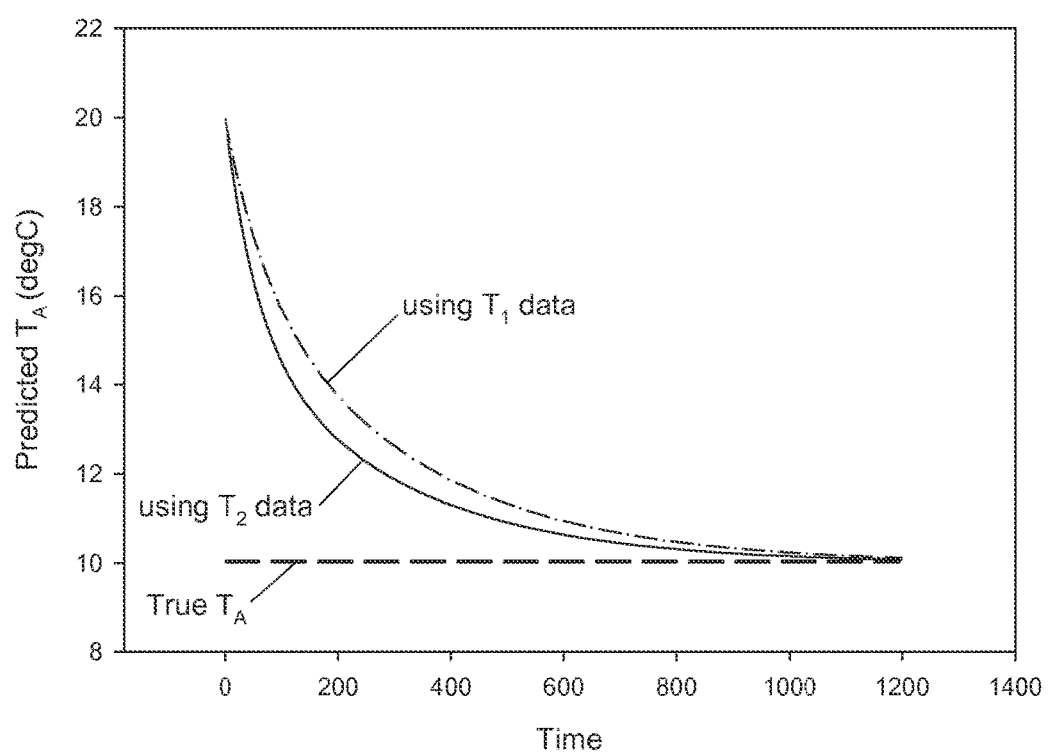
FIG. 5 shows an example of an ambient temperature prediction.

FIG. 5 shows an example of an ambient temperature prediction. In the example shown in FIG. 5, the thermal resistance R2 is intentionally reduced by half and the ambient temperature. $T_A$, is calculated using measurement data from the first sensor (T1) and the second sensor (T2), the adjusted thermal resistance R2 and the other parameters (C1, C2, R1) which have not been adjusted. It can be seen that the first prediction $T_A1$, i.e. the prediction of $T_A$ in dependence on T1, starts to deviate from the second prediction $T_A2$, i.e. the prediction of $T_A$ in dependence on T2. Then, parameter R2 is tuned by step-wise recalculating $T_A1$ and $T_A2$ for different values of R2 until a close match between $T_A1$ and $T_A2$ is found. As a result of this tuning, the difference between the first prediction $T_A1$ and the second prediction $T_A2$ becomes smaller.

The tuning of the parameter may be initiated a few seconds up to a few minutes after a significant change in the ambient temperature, at which the deviation of the predicted $T_A$ values may be relatively large. Any known method for detecting such a significant change may be used in combination with the presently disclosed method. Such methods include, without limitation, regular sampling of temperature changes, temperature trending detection techniques and edge detection techniques.

It is noted that one or more self-heating corrections methods may be used to correct for self-heating effects in the mobile device, in addition to and in combination with the presently disclosed method. Such a self-heating correction method may use the same temperature sensors as the presently disclosed method. In addition, by using a multiple sensor configuration, and/or by using other information such as power consumption, current consumption, battery level and voltage, CPU loading, it may be determined if a change in temperature (of T1 or T2) is caused by internal self-heating or by a change in ambient temperature, which is helpful for the prediction, e.g. to determine whether or not a self-heating correction method is to be deployed. When a change in temperature is caused by an ambient temperature change, the temperature of a sensor closer to environment (T2 in FIG. 2) should change faster than the temperature of a sensor deeper inside the mobile device (T1 in FIG. 2). When a change in temperature is mainly caused by self-heating, the opposite will occur: the temperature of the sensor deeper inside the mobile device (thus closer to the heat sources) will change faster than the temperature of the sensor closer to the ambient air. By comparing the change rates of the respective sensor data, it may therefore be determined whether the mobile device is exposed to a change in ambient temperature or subject to self-heating.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 method of predicting an ambient temperature
102 first temperature measurement
104 second temperature measurement
106 first prediction of ambient temperature
108 second prediction of ambient temperature
110 compare first prediction with second prediction
112 adjust parameter
114 conclude ambient temperature
116 mobile device
118 sensor and processing unit
120 sensor
122 sensor
124 sensor
126 sensor
128 data bus
130 mobile device
132 sensor
134 processing unit

The invention claimed is:

1. A method of predicting an ambient air temperature around a mobile device, wherein:
   a primary temperature sensor comprised in said mobile device measures a first temperature value;
   at least one secondary temperature sensor comprised in said mobile device measures a second temperature value;
   a processing unit comprised in said mobile device calculates a first prediction of the ambient air temperature around the mobile device in dependence on the first temperature value and at least one parameter which is indicative of a thermal resistance of one or more mobile device components based on the first temperature value measurement and the second temperature value measurement;
   the processing unit calculates a second prediction of said ambient air temperature in dependence on the second temperature value and said parameter;
   the processing unit compares the first prediction with the second prediction and adjusts said parameter if a difference between the first prediction and the second prediction exceeds a predefined maximum;
   wherein the primary temperature sensor and the secondary temperature sensor are located at different positions in the mobile device, such that a thermal resistance between the primary temperature sensor and ambient air around the mobile device is different from a thermal resistance between the secondary temperature sensor and the ambient air around the mobile device.

2. A method as claimed in claim 1, wherein the processing unit repeatedly
recalculates the first prediction and the second prediction,
compares the first prediction with the second prediction and
adjusts said parameter until the difference between the first prediction and the second prediction is equal to or lower than the predefined maximum.

3. A method as claimed in claim 1,
wherein, if the difference between the first prediction and the second prediction is equal to or lower than the predefined maximum, the processing unit concludes that the ambient temperature is equal to the first prediction, to the second prediction or to a value between the first prediction and the second prediction.

4. A method as claimed in claim 1, wherein said parameter is at least indicative of the thermal resistance of a casing of the mobile device.

5. A method as claimed in claim 1,
wherein the primary temperature sensor is located closer to the edge of the mobile device than the secondary temperature sensor.

6. A mobile device comprising:
a primary temperature sensor configured to measure a first temperature value;
at least one secondary temperature sensor configured to measure a second temperature value;
a processing unit configured to calculate a first prediction of an ambient air temperature around the mobile device in dependence on the first temperature value and at least one parameter which is indicative of a thermal resistance of one or more mobile device components based on the first temperature value measurement and the second temperature value measurement;
the processing unit further configured to calculate a second prediction of said ambient air temperature in dependence on the second temperature value and said parameter;
the processing unit further configured to compare the first prediction with the second prediction and to adjust said parameter if a difference between the first prediction and the second prediction exceeds a predefined maximum;
wherein the primary temperature sensor and the secondary temperature sensor are located at different positions in the mobile device, such that a thermal resistance between the primary temperature sensor and ambient air around the mobile device is different from a thermal resistance between the secondary temperature sensor and the ambient air around the mobile device.

7. A mobile device as claimed in claim 6, wherein the processing unit is further configured to repeatedly recalculate the first prediction and the second prediction, compare the first prediction with the second prediction and adjust said parameter until the difference between the first prediction and the second prediction is equal to or lower than the predefined maximum.

8. A mobile device as claimed in claim 6,
wherein the processing unit is further configured to conclude, if the difference between the first prediction and the second prediction is equal to or lower than the predefined maximum, that the ambient temperature is equal to the first prediction, to the second prediction or to a value between the first prediction and the second prediction.

9. A mobile device as claimed in claim 6,
wherein said parameter is at least indicative of the thermal resistance of a casing of the mobile device.

10. A mobile device as claimed in claim 6,
wherein the primary temperature sensor is located closer to the edge of the mobile device than the secondary temperature sensor.

11. A mobile device as claimed in claim 6,
wherein the processing unit is integrated with the primary temperature sensor in a single chip.

12. A mobile device as claimed in claim 6,
comprising a plurality of secondary temperature sensors,
wherein the processing unit is further configured
to calculate a plurality of second predictions based on second temperature values measured by said secondary temperature sensors and on said parameter,
to compare each second prediction with the first prediction, and
to adjust the parameter until the difference between each second prediction and the first prediction is equal to or smaller than the predefined maximum.

13. A temperature sensing chip, comprising:
an input configured to receive a first temperature measurement from a primary temperature sensor and receive a second temperature measurement from a secondary temperature sensor;
a microcontroller configured to calculate a first prediction of an ambient air temperature around the temperature sensing chip based on the first temperature measurement and a thermal resistance of one or more components coupled to the chip;
the microcontroller further configured to calculate a second prediction of said ambient air temperature in dependence on the second temperature measurement and the thermal resistance;
the microcontroller further configured to compare the first prediction with the second prediction and to adjust the thermal resistance if a difference between the first prediction and the second prediction exceeds a predefined maximum;
wherein the primary temperature sensor and the secondary temperature sensor are located at different positions in a mobile device, such that a thermal resistance between the primary temperature sensor and ambient air around the mobile device is different from a thermal resistance between the secondary temperature sensor and the ambient air around the mobile device.

* * * * *